Jan. 3, 1956  H. W. KEEVIL  2,729,785
MULTI-CYCLE DETECTOR
Filed Jan. 17, 1952
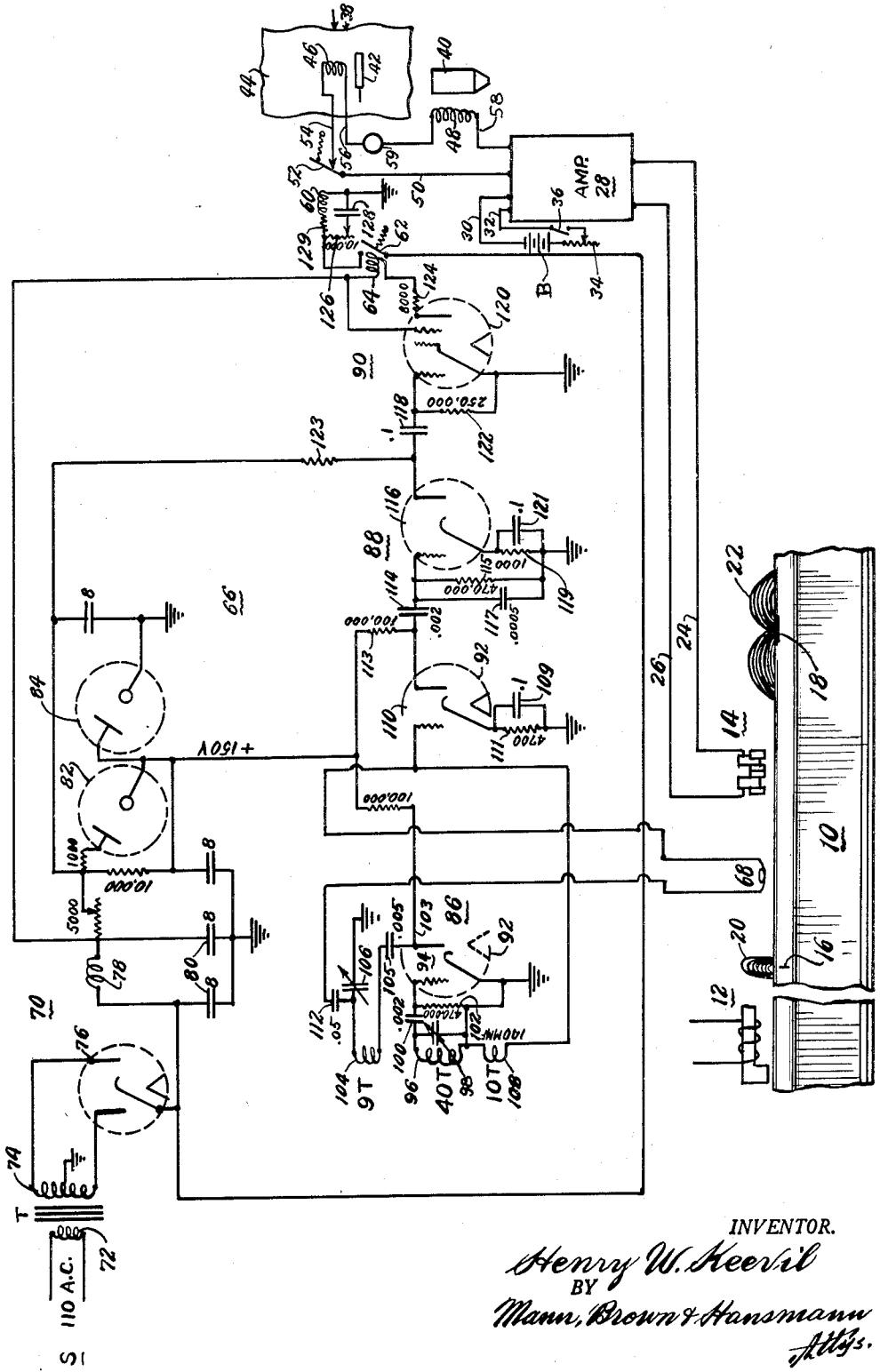
INVENTOR.
Henry W. Keevil
BY
Mann, Brown & Hansmann
Attys.

United States Patent Office 2,729,785
Patented Jan. 3, 1956

2,729,785

MULTI-CYCLE DETECTOR

Henry W. Keevil, Evanston, Ill.

Application January 17, 1952, Serial No. 266,971

3 Claims. (Cl. 324—37)

The present invention relates to a method of and apparatus for detecting discontinuities, irregularities or other abnormal conditions in metallic objects and finds particular use in the field of flaw detection in railroad tracks. The invention is, however, capable of a wide variety of uses and the same may, with or without modification, be employed for detecting flaws in oil well casings, steel shafting and similar bodies which are usually formed of ferrous material and which, therefore, are magnetizable as well as non-magnetizable objects such as electrical conductors, non-magnetic tubing, shafting and the like.

Heretofore in the electro-inductive system of detecting flaws in rails wherein a relatively strong unidirectional current is progressively passed through sections of the rail and a scanning coil is moved along the rail to locate variations in the electro-magnetic field surrounding the rail, as well as in the magnetic system wherein a strong magnetic flux is passed through the rail and the rail scanned for the presence of residual magnetism in the vicinity of flaws, considerable difficulty has been encountered in the elimination of false indications, i. e. indications that are caused by inconsequential surface defects such as burns, shelly rail, gags, magnetic spots, etc. It has long been a problem to differentiate the false indications produced by such surface defects from the true indications set up by sub-surface fissures.

Various methods and apparatus have been devised in an effort to differentiate between the relatively unimportant defects or flaws which are of a non-fissure character and the extremely dangerous fissure defects which ordinarily are not "cracked out" but which lie well within the head of the rail.

Many of these methods consist in the use of a scanning apparatus which will enable a great number of flaw indications to be recorded while at the same time affording a means for differentiating between those indications produced by internal fissures and those caused by surface defects. For this purposes a plurality of scanning or pickup coils have been employed for a single rail section, each coil having a different degree of sensitivity to fissures, with at least one of the coils being almost totally insensitive to surface blemishes such as those mentioned above. No one coil can be relied upon to the exclusion of the others in normal testing but the combined indications rendered by all of the coils, when properly interpreted, enable the operator to place a considerable degree of reliance upon the recordings inasmuch as the false indications rendered by one or more coils may be disproven by one or more of the other coils. Such methods, however, are not infallible inasmuch as the human element is always present when interpreting the records for a particular rail section.

The present invention is designed to overcome the above-noted limitations that are attendant upon the use of prior methods and apparatus for the testing of rails for internal defects and toward this end, briefly; it contemplates the provision of auxiliary apparatus which may be employed in conjunction with known methods of and apparatus for locating fissures, as, for example, the detecting and recording apparatus shown and described in the patent to Barnes et al., No. 2,317,718, dated April 27, 1943, for "Method of and Apparatus for Detecting Flaws in Magnetizable Bodies," and which auxiliary apparatus will respond only to surface defects and, by its response thereto, "cancel out," so to speak, defects that otherwise would show counterpart response by the recording apparatus and thus prevent recording of such surface defects.

Briefly, the invention contemplates the provision of a self-contained assemblage of instrumentalities including a scanning or exploring coil adapted to be progressively passed over the surface of the object undergoing investigation. The scanning coil constitutes part of an electronic device having associated therewith a balanced oscillator circuit which normally remains in oscillation during the scanning operation by the pickup coil until such time as a surface defect is encountered. At such time the inductive reactance of the pickup coil undergoes a change and causes the oscillator circuit to become unbalanced and thus to cease oscillation, whereupon an output or work circuit is energized and caused to perform useful work which may be the actuation of a suitable relay device for preventing recording of the surface defect by the recording mechanism of the flaw detection equipment.

The provision of an apparatus briefly outlined above being the principal object of the invention, another object is to provide a flaw-detecting apparatus of this character which, unlike other flaw-detection apparatus, does not rely for its operation upon magnetism of the rail, the prior introducing of a current flow therein, or any prior treatment of the rail during scanning thereof.

A further object of the invention in one form thereof is to provide an apparatus of the character set forth above which is readily applicable to travelling rail flaw detector car equipment without involving extensive alterations to the equipment or modifications thereof either as regards the mechanical or electric instrumentalities associated therewith.

Other objects and advantages of the invention, not at this time enumerated, will become more readily apparent as the nature of the invention is better understood.

In the accompanying drawing, forming a part of this specification, one embodiment of the invention has been illustrated.

In this drawing the single figure is a schematic view of one form of the invention showing the same operatively associated with a flaw-detection apparatus of the magnetic type and showing the same in actual use on a rail undergoing testing.

It will be understood that the disclosure of certain preferred forms of this invention is made in compliance with section 4888 of the Revised Statutes and that the appended claims are to be construed as broadly as the prior art will permit.

Referring now to the drawing the invention has been illustrated in connection with its use in the residual magnetic system of testing rails for flaws as exemplified in Patent No. 2,317,718 previously mentioned. The invention, however, is equally useful in other systems such as the electro-inductive system to which the invention is applicable in substantially the same form in which it is herein illustrated.

In the electro-magnetic system of flaw detection, a rail such as the rail 10 undergoing investigation is first energized by one or more (usually three) magnets represented diagrammatically by the magnet 12. Thereafter, a pickup or detector coil 14 preferably tuned to fissure field characteristics, as disclosed in the application of John C. Dionne, Serial No. 59,955, filed November 13, 1948, now Patent No. 2,602,108, is moved along the rail beyond the effective field of the magnet 12 so as to be subject to the influence of only the residual fields surrounding the rail in the vicinity of irregularities therein. The magnets 12 are powerful electromagnets and their main purpose is to apply a strong magnetic flux longitudinally through the rail. They are suitably mounted on detector cars, upon which is also mounted the pickup coil 14. As the flux enters the rail, there is at the rail surface a strong vertical flux passing from the front magnet pole to the rail, which then extends rearwardly through the rail, and the effect of this flux is to produce a magnetic field in the vicinity of internal flaws such as the internal fissure represented at 16 as well as in the vicinity of surface defects such as are indicated by the burn 18. The more dangerous internal flaws such as the flaw 16 are strongly affected by the longitudinal flux in the rail and produce a magnetic field which is generally of the type shown at 20, although no effort has been made to plot the exact nature of this field. Surface defects such as the burn 18 appear to be strongly affected by the vertical flux as it enters the rail and produces a magnetic field such as the field 22 in which the magnetic flux tends to pass upwardly from the burn area and outwardly in all directions so as to re-enter the rail beyond the burn. Whether this is actually the nature of the field or not is immaterial, but the fact remains that the pickup or scanning coil 14 associated with the flaw-detection apparatus is sensitive to the type of irregularity indicated at 16, and sometimes to the type of irregularity indicated at 18, so that the goal is to eliminate recordation of the burn indication, and record only the fissure indication.

According to the above-mentioned patent, amplifying circuits are provided which are sufficiently quick-acting in response to voltage variations in the pickup coil 14 to actuate certain recording instrumentalities. The nature of these circuits forms no part of the present invention, and reference may be had to the above-mentioned patent for a full understanding thereof. It is deemed sufficient for purposes of disclosure herein to state that the detector coil 14 has its winding connected through leads 24 and 26 to the input side of an amplifier generally designated at 28, which, for purposes of this disclosure, may be considered as a conventional thermionic amplifier, the heater circuit of which includes leads 30 and 32 connected across a battery B, a variable rheostat 34 and switch 36 being arranged in series in the circuit to control the application of current to the heating filaments of the amplifier tubes. The output of the amplifier 28 serves to control the operation of a recording device 38 and of a paint gun 40, the former including a pen or stylus 42 which causes an indication to be made on a record tape 44, a fragment of which has been shown, and the paint gun 40 causing an indication to be made on the rail 10 in the vicinity of a detected flow. Accordingly, a pen control magnet 46 and a paint gun relay magnet 48 are arranged in series in the circuit which may be traced from the amplifier through lead 50, relay control switch 52 (the function of which will be described presently), lead 54, pen magnet 46, lead 56, paint gun magnet 48 and lead 58 back to the amplifier 28. A milliammeter 59 may be interposed in the lead 56 to render indications for sensitivity adjusting purposes.

The arrangement of parts thus far described insofar as they pertain to the main pickup 14 and the amplification and recording of indications therefrom, and with the exception of the relay-operated switch 52, is more or less conventional and no claim is made herein to any novelty associated therewith, the present invention consisting rather in the novel construction and arrangement of parts now about to be described.

The relay-operated switch 52 is normally closed but is adapted to be opened upon energization of a control magnet 60 having associated therewith time-delay mechanism, subsequently to be described, by means of which the switch 52 is retarded in its closing action. The relay coil or magnet 60 is disposed in an energizing circuit leading from the power supply unit of an electronic detector circuit arrangement employed in connection with the present invention and in which energizing circuit there is disposed a relay-operated switch 62 of the fast-acting type which is operable under the control of a relay coil magnet 64 disposed in the output or plate circuit of the power tube associated with the previously-mentioned detector circuit. As will be made clear presently, the plate current flowing through the magnet 64 is normally maintained at a low value which is insufficient to cause closure of the normally-open switch 62; however, when the flow of current through the magnet 64 increases to a predetermined degree, the switch 62 is adapted to become immediately closed, thus energizing the coil magnet 60 and opening the switch 52 controlled thereby, thereby rendering the recording instrumentalities 38 and 40 inoperative.

The electronic detector apparatus employed in connection with the present invention is diagrammatically shown in the drawing and is designated in its entirety at 66. This apparatus includes a scanning or pickup coil 68 which may be mounted on the travelling detector car and which is adapted to traverse the rail 10 immediately ahead of the pickup coils 14 associated with the magnet or other flaw-detection apparatus. The coil 68, other than its positioning with respect to the coil 14, has no electrical or magnetic association with the latter coil and it operates independently of the coil 14 as well as of the flux-producing magnets 12 to detect the presence of irregularities in the rail 10 such as small surface cracks which are almost invariably present in burned areas such as the surface burn 18. The pickup coil 68 is entirely unrelated to the presence of residual magnetic fields such as the fields 20 and 22 associated with the fissure 16 and burn 18, respectively, and, as will become clear presently, the coil 68 acts upon an entirely different principle by setting up certain eddy currents in the rail surface which are blocked by the presence of surface cracks associated with surface burns, thus rendering a reflux action tending to change the inductive reactance of the pick-up coil. Any change in the inductive reactance of the pickup coil serves to terminate the oscillations normally maintained in an oscillating section of the detector circuit arrangement 66, and this cessation of oscillations is caused to set into operation certain circuit instrumentalities by means of which the relay magnet 64 becomes energized to close its control switch 62 and, in turn, energize the relay magnet 64 in order to open the switch 52 and disable the recording instrumentalities 38 and 40 in the manner previously described. The pickup coil 68 is not sensitive to deep-seated fissures in the rail head such as the fissure 16, and thus the inductive reactance of the coil in passing over such fissures remains unaltered.

The electronic detector circuit 66 involves in its general organization a power supply section 70 of conventional design which includes the usual power transformer T having a primary winding 72 connected to a source of power S and a center-tapped secondary winding 74; full-wave rectifier tube 76, filter choke coil 78, condensers 80 and voltage regulator tubes 82 and 84 for supplying plate voltage to the other tubes of the circuit as well as for supplying current to the relay magnet 60 when the normally-open switch 62 becomes closed. The means for supplying filament current to the various vacuum tubes associated with the assembly 66 has not been shown herein. The detector circuit 66 further includes an oscillator section 86, an amplifier section 88 including two stages of amplification, and a power or output section 90, in the output circuit of which the fast-acting relay magnet 64 is disposed. The oscillator section 86 employs a twin type of thermionic vacuum tube 92 which may be of the twin triode type having two sets of tube elements which operate independently except for the provision of a common heater filament. One triode section 94 of the twin tube 92 is connected as a regenerative oscillator. A parallel tuned circuit consisting of a grid coil 96 and a tuning condenser 98 is connected between the grid of triode section 94 and ground. Grid leak biasing is applied to the triode section 94 by means of condenser 100 and resistor 102, which is connected between the grid and cathode. D.-C. grid current is blocked by condenser 100 and hence flows only through resistor 102 to provide the biasing.

The plate of the triode section 94 is connected to the power supply section 70 by a lead 103. A tickler coil 104, blocking condenser 105, and feed-back adjusting condenser 106 are connected in series between the plate and ground and hence parallel the plate voltage supply. Grid coil 96 and tickler coil 104 are inductively coupled, and thus alternating current voltages will be induced in the grid circuit by alternating current flowing in the tickler coil to provide regeneration and permit sustained oscillation.

The feed-back adjusting condenser 106 is paralleled by a series circuit comprising a condenser 112, pickup coil 68, and coupling coil 108. Coupling coil 108 is inductively coupled to grid coil 96 and tickler coil 104. D.-C. current is prevented from flowing through tickler coil 104, coupling coil 108 and pickup coil 68 by blocking condenser 105. Hereinafter, the circuit containing these last-named elements and condensers 105 and 112 will be referred to as the A.-C. plate circuit. The oscillating frequency of the oscillator section 86 is controlled by tuning condenser 98. While frequencies from 5,000 to 40,000 C. P. S. give satisfactory results, it has been found that a frequency of approximately 30,000 C. P. S. produces the best results, although in some instances lower frequencies are preferred due to their ease of handling. The tuned grid circuit is adjusted to the desired frequency by changing the value of tuning condenser 98 until grid coil 96 and tuning condenser 98 are in parallel resonance at the desired frequency.

Sustained oscillation will exist when the regenerative feed-back voltage induced in the grid circuit from the tickler coil 104 is of a sufficient magnitude. The magnitude of the feed back voltage is dependent upon the current flowing through the tickler coil 104 and, in turn, the value of current flow is dependent upon the impedance of the A.-C. plate circuit. Since feed-back adjusting condenser 106 is connected in parallel with pickup coil 68, coupling coil 108 and condenser 112 to provide a tuned plate circuit and since this parallel circuit is in series with the tickler coil 104, varying the reactance of either the feed-back adjusting condenser 106 or pickup coil 68 will vary the A.-C. plate current. With the pickup coil 68 disposed above a homogeneous rail surface, the feed-back adjusting condenser 106 is set so that the oscillations are steady, i. e., the oscillator is stable. As long as the inductive reactance of scanning coil 68 remains substantially constant, the oscillations will be maintained.

The grid of triode section 110 of tube 92 is connected intermediate the pickup coil 68 and coupling coil 108 to couple the amplifier section 88 to the oscillator section 86. The cathode of section 110, which is connected as an amplifier stage, is connected to ground through a cathode biasing network made up of by-pass condenser 109 and biasing resistor 111. Since coupling coil 108 and the series circuit comprising pickup coil 68, condenser 112 and feed-back adjusting condenser 106 are connected between the grid of section 110 and ground, the A.-C. voltages of oscillator frequency developed across these circuit elements will appear as grid voltage on the section 110.

Section 110 is connected in cascade with the voltage amplifier tube 116 by means of coupling resistor 113 and coupling condenser 114. Grid-leak resistor 115 and condenser 117 are connected between the grid and cathode of tube 116 to prevent the grid from being isolated to direct current. Tube 116 is biased by means of cathode resistor 119 and by-pass condenser 121.

Section 116 is connected in cascade with a power tube 120 by means of coupling resistor 123 and coupling condenser 118. The A.-C. voltage from tube 116 is impressed across a grid-leaking biasing resistor 122 which is connected between the cathode and the grid of power tube 120. The value of resistor 122 is selected so that as long as oscillation continues the power tube 120 will be biased to hold its plate current at a value insufficient to cause relay magnet 64 to close switch 62. The A.-C. voltages applied across grid-leak biasing resistor 122 cause the grid to go positive relative to the cathode over a portion of each cycle and hence cause D.-C. grid current to flow from the grid to the cathode and back to the grid through grid biasing resistor 122. The D.-C. voltage drop thus developed across resistor 122 biases the grid negatively. When oscillations cease in section 86, the A.-C. voltage across resistor 122 no longer exists and this removes the D.-C. negative bias from tube 120, and, consequently, the plate current increases substantially. The increase in plate current is sufficient to cause relay magnet 64 to close switch 62. A limiting resistor 124 is placed in the plate circuit of the power tube 120 to prevent excessive plate current when oscillations cease, since at this time there is no bias of the power tube 120. Closing of the switch 62 causes energization of the relay magnet 60 which receives its energizing current from the power-supply section 70. Energization of the relay magnet 60 causes the switch 52 to open, and thereby disables the recording instrumentalities 38 and 40 and prevents either the recording pen 42 or paint gun 40 from performing their recording functions.

The relay magnet 60 has associated therewith an adjustable time-delay holding circuit consisting of a rheostat 126 and a condenser 128. A current-limiting resistor 129 is connected in series with coil 60 and the rheostat 126 and condenser 128 are connected in parallel across these elements. When switch 62 is closed, current will pass through coil 60 to open switch 52, while at the same time condenser 128 is being charged through rheostat 126. When switch 62 is then opened, condenser 128 will discharge through rheostat 126, limiting resistor 129 and coil 60 to maintain the magnetic field about coil 60 and hold switch 52 open for a fraction of a second after switch 62 has been opened.

In the operation of the apparatus during the testing of a particular rail section, the pickup coil 68 moves along the railhead 10 immediately ahead of the pickup coils 14 associated with the amplifier 28 of the magnetic test equipment. With the section 86 set for sustained oscillations, A.-C. current will flow through pickup coil 86 and the magnetic field created thereby will be linked with the rail. As long as the inductive reactance of the scanning coil 68 remains substantially constant, as evidenced by the absence of a surface defect such as surface cracks below the scanning coil, the oscillations will be maintained. When the scanning coil 68 encounters surface cracks, its inductive reactance is affected and changed to a different value and thereby reduces the feed-back to the grid circuit of the oscillator and terminates the oscillations. Upon so terminating the oscillations, the bias is removed from power tube 120, as previously explained, and the plate current increases to a sufficiently large value to close switch 62. Closing switch 62 causes relay magnet 60 to be energized to open switch 52, thus disabling the recording instrumentalities 38 and 40 and preventing the record pen 42 and paint gun 40 from performing their recording functions.

The termination of oscillation in the oscillator section 86 of the detector circuit 66 is of but slight duration and lasts only while the coil 68 is in close proximity of the encountered surface flaw and while its normal inductive reactance has thus been altered. As soon as the coil has passed beyond the effective range of the surface defect, normal oscillations under the control of the tuning condenser 98 are resumed, thus again placing a negative bias on the grid of the power tube 120 and causing the plate current of this tube to drop below a point which will sustain energization of the relay magnet 64. The energization of this magnet permits immediate opening of the switch 62 and a subsequent delayed closing of the switch 52 in the manner previously described. With the oscillating section 86 adjusted for oscillation at the selected frequency which, as stated above, may be on the order of from 5,000 to 40,000 C. P. S., there is little likelihood of losing control of the oscillator which will always assume an oscillatory condition whenever the normal reactance of the coil 68 is established.

The adjustable time-delay holding circuit associated with relay magnet 60 serves to hold switch 52 open until such a time as the fissure pickup coils 14 have passed over the burn or surface cracks on the rail which occasioned the initial termination of the oscillations. The effective resistance of rheostat 126 is adjusted so that the switch 52 will be held open until the fissure pickup coils 14 have been carried past the burn or surface crack; otherwise, in the absence of the time-delay mechanism, the burn or surface crack might produce an indication by the recording instrumentalities.

The specific capacitance, inductance and resistance value of the various electrical instrumentalities associated with the detector circuit 66 have not been specified in this description, nor have the exact definitions of the thermionic vacuum tubes employed been set forth. However, suggested values for these devices have been shown in legend form in the drawing. In accordance with electronic engineering practices, the resistance values are expressed in ohms and the capacitance in microfarads. No inductance values such as are ordinarily expressed in henries have been applied to the coils 96, 104 and 108. These coils are all wound upon the same form and the number of turns involved has been legended in the drawing. The pickup coil 68 may for the installation shown consist of approximately twenty-five turns of wire on a non-metallic core having a mean diameter of approximately one inch.

The rectifier tube 76 may be of the 6X5 variety, while the dual triode tube 92 is preferably of the 7SN7 type. The amplifier tube 116 is preferably a hi-mu triode of the 6SQS type. The power tube 120 may be of the 6V6 type which is a beam power amplifier tube.

The various electrical instrumentalities shown and the values assigned thereto by legending on the drawings and the types of thermionic units employed when assembled in a detector circuit in the manner illustrated in the drawing will produce an operative detector circuit capable of efficiently performing the function ascribed to it. Other variations of this circuit will readily occur to those versed in the art. Such circuits are entirely feasible and the one shown is one of a family of such circuits which has been chosen as being ideally descriptive of the above set forth mode of operation.

I claim:

1. In an apparatus for locating relatively-deep internal flaws in rails, rail magnetizing means movable along the rail for inducing a magnetic flux into the rail to set up characteristic residual magnetic conditions in the vicinity of such flaws as well as in the vicinity of surface defects, detector means likewise movable along the rail and adapted to produce an electrical impulse whenever said detector means traverses such fields, recording means potentially responsive to the production of an impulse by said detector means to produce a recording, a vacuum tube regenerative oscillator having a tuned input circuit, means to produce an electro-magnetic field, said means including a coil operatively connected to said oscillator and likewise movable along the rail with its longitudinal axis substantially at right angles to the length of the rail whereby successive portions of the rail are subjected to the external field of said coil to produce eddy currents in the object whereby surface cracks therein block the normal path of said eddy currents and change the reluctance of said field and, consequently, the reactance of said coil to an extent sufficient to render said oscillator circuit incapable of sustaining oscillations, means operable upon termination of oscillations in said oscillator circuit for producing an electrical impulse, and relay means operable upon production of an electrical impulse by said latter impulse producing means for rendering said first-mentioned impulse-producing means ineffective.

2. In an apparatus for locating relatively deep internal flaws in rails, rail magnetizing means movable along the rail for inducing a magnetic flux into the rail to set up characteristic residual magnetic conditions in the vicinity of such flaws as well as in the vicinity of surface defects, detector means likewise movable along the rail and adapted to produce an electrical impulse whenever said detector means traverses said field, recording means potentially responsive to the production of an impulse by said detector means to produce a recording, a vacuum tube regenerative oscillator having a tuned input circuit means to produce an electromagnetic field, said means including a coil operatively connected to said oscillator and likewise movable along the rail whereby successive portions of the rail are subjected to the external field of said coil to produce eddy currents in the object whereby surface defects therein block the normal path of said eddy currents and change the reluctance of said field and, consequently, the reactance of said coil to an extent sufficient to render said oscillator circuit incapable of sustaining oscillations, means operable upon termination of oscillations in said oscillator circuit for producing an electrical impulse and relay means operable upon production of an electrical impulse by said latter impulse producing means for rendering said first mentioned impulse producing means ineffective.

3. The method of detecting relatively deep fissures in a metallic body which consists in subjecting progressive increments of the body to a longitudinal magnetizing force and thus establishing residual magnetic fields in the vicinity of such fissures as well as residual magnetic fields in the vicinity of surface cracks, inductively detecting said fields by electrical impulses, simultaneously inducing eddy currents in such progressive increments of the rail to establish alternating expanding and collapsing magnetic fields in the vicinity of the surface cracks and detecting the presence of such cracks by initiating impulses, utilizing said first mentioned impulses to potentially energize a work circuit and utilizing said second mentioned impulses to render said first mentioned impulses ineffective.

References Cited in the file of this patent

UNITED STATES PATENTS

| Number | Name | Date |
|---|---|---|
| 1,815,717 | Kranz | July 21, 1931 |
| 2,217,843 | Langer | Oct. 15, 1940 |
| 2,267,884 | Zuschlag | Dec. 3, 1941 |
| 2,326,344 | Elmendorf et al. | Aug. 10, 1943 |
| 2,337,231 | Cloud | Dec. 21, 1943 |
| 2,353,211 | Zuschlag | July 11, 1944 |
| 2,576,173 | Cornelius | Nov. 27, 1951 |

FOREIGN PATENTS

| 367,928 | Great Britain | Mar. 3, 1932 |